(12) United States Patent
Meiβner

(10) Patent No.: US 7,414,520 B2
(45) Date of Patent: Aug. 19, 2008

(54) STEERING WHEEL FOR MOTOR VEHICLES

(75) Inventor: Dirk Meiβner, Berlin (DE)

(73) Assignee: Takata-Petri AG (DE)

( * ) Notice: Subject to any disclaimer, the term of this patent is extended or adjusted under 35 U.S.C. 154(b) by 130 days.

(21) Appl. No.: 11/243,505

(22) Filed: Oct. 4, 2005

(65) Prior Publication Data

US 2006/0070795 A1 Apr. 6, 2006

Related U.S. Application Data

(63) Continuation of application No. PCT/DE2004/000627, filed on Mar. 22, 2004.

(30) Foreign Application Priority Data

| Apr. 4, 2003 | (DE) | ................................ 103 16 738 |
| Nov. 6, 2003 | (DE) | ................................ 103 52 733 |

(51) Int. Cl.
*B60Q 1/00* (2006.01)
(52) U.S. Cl. .................... 340/438; 340/426.31; 116/36
(58) Field of Classification Search ............ 340/426.31, 340/438, 425.5, 457; 116/28 R, 31, 36
See application file for complete search history.

(56) References Cited

U.S. PATENT DOCUMENTS

| 5,821,935 A | * | 10/1998 | Hartman et al. ............. 715/839 |
| 6,474,688 B1 | | 11/2002 | Bogren et al. |
| 6,739,620 B2 | * | 5/2004 | Derrick ....................... 280/731 |
| 6,860,508 B2 | | 3/2005 | Keutz |

FOREIGN PATENT DOCUMENTS

| DE | 196 04 351 A1 | 8/1997 |
| DE | 198 21 163 A1 | 11/1999 |
| DE | 699 09 885 T2 | 11/1999 |
| DE | 198 52 315 A1 | 5/2000 |
| DE | 200 14 731 U1 | 2/2002 |
| DE | 201 16 618 U1 | 3/2002 |
| DE | 201 01 014 U1 | 7/2002 |

(Continued)

OTHER PUBLICATIONS

Translation of PCT Internation Translation of PCT International Preliminary Examination Report received Apr. 3, 2006 for International Application No. PCT/DE2004/000627 (5 pages).al Preliminary Examination Report received Apr. 3, 2006 for International Application No. PCT/DE2004/000627 (5 pages).

(Continued)

*Primary Examiner*—Daryl C Pope
(74) *Attorney, Agent, or Firm*—Fitch, Even, Tabin & Flannery

(57) ABSTRACT

A steering wheel for motor vehicles is disclosed. The aim of the steering wheel is to supply information from a driver guidance system or a driver assistance system to a driver in such a way that said information is easily received and that the driver can also input information for said systems or for a telephone, without having to divert his or her attention from the traffic. To achieve this, the steering wheel is configured as a communication interface for the driver.

8 Claims, 17 Drawing Sheets

FOREIGN PATENT DOCUMENTS

| | | |
|---|---|---|
| DE | 101 13 493 A1 | 9/2002 |
| EP | 0 302 193 A1 | 2/1989 |
| EP | 0 640 903 A1 | 3/1995 |
| EP | 1 275 550 A1 | 1/2003 |
| EP | 0 958 965 B1 | 7/2003 |
| FR | 2 744 976 A1 | 8/1997 |
| JP | 53-17047 | 7/1951 |
| JP | 63-197774 | 2/1963 |
| JP | 62-133599 | 6/1987 |
| JP | 5-30998 | 4/1993 |
| JP | 7-10007 | 1/1995 |
| JP | 8-80792 | 3/1996 |
| JP | 8-161667 | 6/1996 |
| JP | 8-184453 | 7/1996 |
| JP | 8-210867 | 8/1996 |
| JP | 9-81891 | 3/1997 |
| JP | 9-184737 | 7/1997 |
| JP | 9-330496 | 12/1997 |
| JP | 11-73598 | 3/1999 |
| JP | 2000-149190 | 5/2000 |
| JP | 2000-168403 | 6/2000 |
| JP | 2001-168468 | 6/2000 |
| JP | 2000-318622 | 11/2000 |
| JP | 2000-335342 | 12/2000 |
| JP | 2001-55149 | 2/2001 |
| JP | 2001-63401 | 3/2001 |
| JP | 2001-06115 | 4/2001 |
| JP | 2001-114112 | 4/2001 |
| JP | 2001-301487 | 10/2001 |
| JP | 2002-174527 | 6/2002 |
| JP | 2002-205658 | 7/2002 |
| JP | 2002-213987 | 7/2002 |
| JP | 2002-267683 | 9/2002 |
| JP | 2002-362191 | 12/2002 |
| JP | 2003-73085 | 3/2003 |
| WO | WO 99/58358 | 11/1999 |
| WO | 02-08847 A2 | 1/2002 |
| WO | WO 02/057116 A1 | 7/2002 |

OTHER PUBLICATIONS

A Japanese Office Action dated Feb. 18, 2008, from the Japanese Patent Office in corresponding Japanese Patent Application No. 2002-504273.

\* cited by examiner

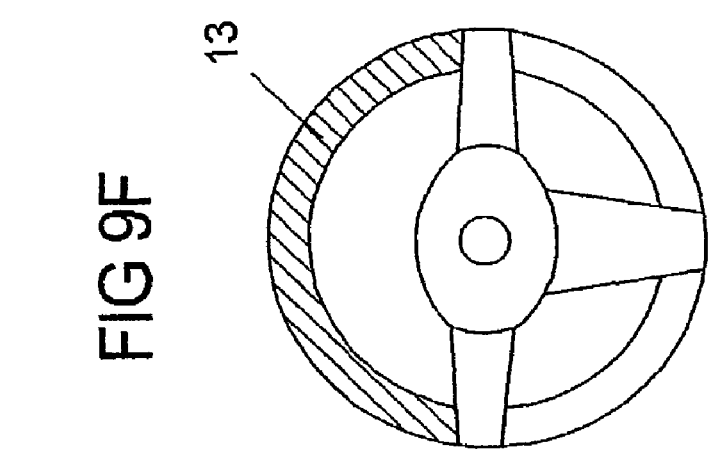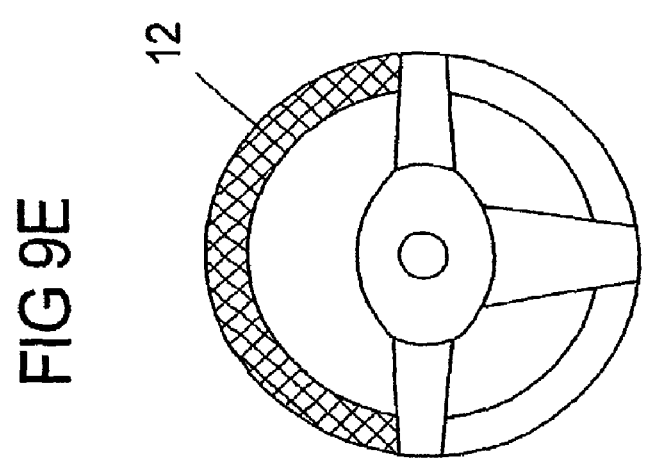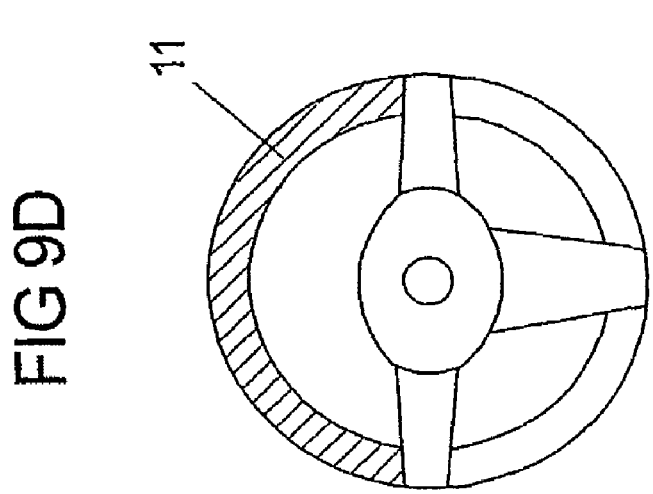

(A - A)

STEERING WHEEL FOR MOTOR VEHICLES

CROSS REFERENCE TO RELATED APPLICATIONS

This is a continuation application of prior application number PCT/DE2004/000627, filed Mar. 22, 2004 and claims the benefit under 35 U.S.C. §119 of prior foreign applications number DE 103 16 738.2, filed Apr. 4, 2003 and number DE 103 52 733.8, filed Nov. 6, 2003.

FIELD OF THE INVENTION

The invention relates to a steering wheel for motor vehicles.

BACKGROUND OF THE INVENTION

Motor vehicle steering wheels are known which have both an air bag and switches or push button keys with which it is possible, for example, to set a station on the radio or even to set its volume without operating the radio itself, which is usually mounted in the dashboard to the side of the driver, and without thus being distracted from the road traffic.

The increasing complexity of road traffic requires increasing driver information about his surroundings. The quantity of information which is transmitted to the driver of the vehicle is therefore increasing. On the other hand, the capacity of the driver to take in information is limited. The driver also has to concentrate on essential driving functions, which also requires increasing concentration because of the increasing amount of road traffic.

For this reason, driver assistance systems for sensing hazardous situations and driver guidance systems are being increasingly used in motor vehicles. It is known to make the driver aware of hazardous situations by means of visual systems in the dashboard or by means of audio systems. The driver guidance systems are equipped with a display which is also arranged in the dashboard. Driver assistance systems are known, for example, from German laid-open patent application 198 21 163 A1 and from European patent application 0 640 903 A1.

The disadvantage of the visual systems is that they are arranged in the dashboard on the other side of the driver, so that in particular when the driver is considering the display of a driver guidance system he cannot pay attention to the road traffic.

SUMMARY OF THE INVENTION

The invention is therefore based on the object of making information, such as, for example, information of a driver guidance system or of a driver assistance system, available to the driver in such a way that he can easily perceive it, and that the driver can also input information for the systems or for a telephone without having to significantly reduce his attentiveness in road traffic.

The invention achieves this in accordance with the features described hereinafter.

Accordingly, the steering wheel is embodied according to the invention as a communications interface for the driver.

The steering wheel is thus equipped, as an information device for the driver, with elements which make it possible to transmit information which is generated by sensors on the motor vehicle or by sensors which detect the vehicle occupant behavior, or by means of signals which are received in the motor vehicle by long range transmission or close range telemetry. Vehicle occupant behavior may be understood to be, for example, the sitting position or driver fatigue.

The arrangement of elements on the steering wheel for providing the driver with information has the advantage that there is virtually no effect on the attentiveness of the driver in road traffic since the steering wheel is also in his field of vision in any case when he is driving.

Light elements and/or displays and/or vibration elements may be integrated into the steering wheel as elements for providing the driver with information.

The elements are preferably arranged in the steering wheel foam trim or in parts of the trim of the steering wheel. It is expedient for the elements to be provided in the upper half of the steering wheel rim of the steering wheel which is in the straight-ahead orientation.

In a further embodiment there is provision for the elements to be arranged distributed uniformly over the steering wheel rim, in which case it is advantageous that only the elements which are located at the top irrespective of the rotation of the steering wheel are actuated, i.e. the elements move with respect to the steering wheel rim as it rotates.

In a further embodiment there is provision for means for detecting the position of the hands on the steering wheel to be provided, and for only elements which are covered by the hands to be actuated.

Different types of light elements may be provided. It is thus possible to use strip-shaped light elements and/or punctiform light elements and/or light elements which are configured as symbols.

Arrows or moving points may be provided as display elements for the recommended direction of travel for a driver guidance system. A change which is to be made to the direction of travel can be displayed in an unambiguous fashion by means of the arrows. This is also possible by means of the moving points and these are then illuminated successively so that the impression is given that a point is moving in the provided direction.

It is expedient that the arrows or points can be actuated as a function of the distance from the location of a change in direction of travel in such a way that they light up to different degrees or have different colors. As a result, the driver can be informed in good time of a necessary change in direction of travel. The fact that the location of the change in direction of travel has been reached can be achieved by an actuation process which triggers flashing of the arrows or points and/or a change in their color from green to red.

It is also possible to provide corresponding color elements, i.e. elements in the colors red, amber, green, for displaying the next item of traffic light information which cannot yet be seen. As a result, it is possible for the driver to adjust his driving style to the possible setting of the traffic lights when he reaches them, as in the case of a set of traffic lights which can already be seen. In addition, a numerical display in the steering wheel may be provided which indicates the period of time until the traffic light display changes next, i.e. when the traffic light changes, for example, from green to red via amber. Such an arrangement is appropriate for adjusting the driving style for any set of traffic lights, i.e. even for sets of traffic lights which are to be seen by the driver.

Warning functions can be represented by changing the colors and/or the radiation intensity of the light elements and/or by flashing the light elements. Thus, in one embodiment there is provision for the reduction in the distance from a vehicle traveling in front to be indicated by changing the color of the light element from green to red. In one embodiment, a strip-shaped light element for representing the warning function is provided in the upper half of the steering wheel rim of the steering wheel which is in the straight-ahead orientation.

In order to display critical driving conditions such as ice, ABS braking, ESP function and traction control function, flashing elements are provided, with each of these critical driving conditions being assigned elements of a specific color.

A further possibility for displaying hazards and displaying critical driving conditions is to arrange vibration elements whose vibration frequency and vibration intensity can be varied. It is expedient for vibration elements to be arranged on the steering wheel in such a way that the vibrations can be felt at least approximately with the same intensity over the entire steering wheel rim.

At least one display that displays both alphanumeric characters and symbols can also be arranged as a display. Said display may serve, for example, as a telephone display and display a caller or a selected number. In a further embodiment, the display elements may be actuated in such a way that the information on the display does not change its position irrespective of the rotation of the steering wheel, i.e. it is, as it were, fixed to the vehicle.

In a further embodiment switches for inputting information for the navigation system and displaying it as well as for a telephone are provided on the steering wheel.

BRIEF DESCRIPTION OF THE DRAWINGS

The invention will be explained in exemplary embodiments with reference to drawings, in which:

FIGS. 9D-9F show the output signals corresponding to the distances of the vehicles in FIGS. 9A-9C, on the steering wheel of the vehicle behind;

DETAILED DESCRIPTION OF THE PREFERRED EMBODIMENTS

Figure 1:
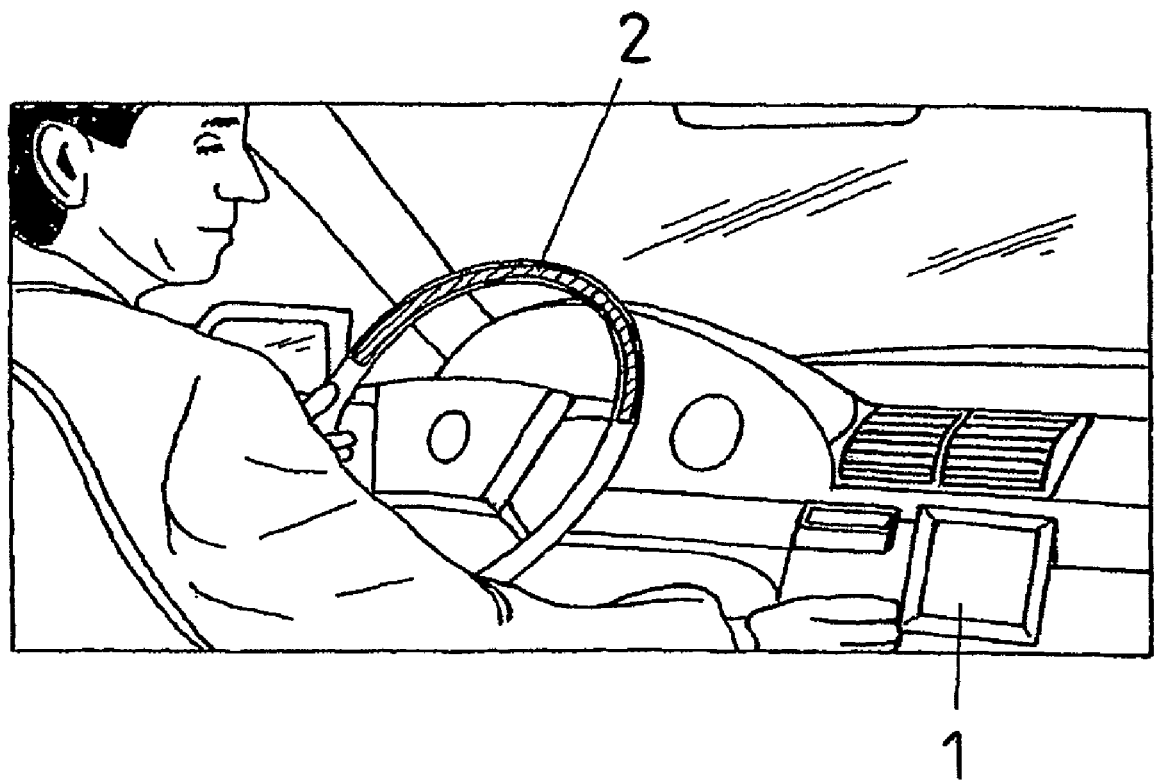
FIG. 1 shows the standard situation when a conventional driver guidance system is applied.

FIG. 1 shows the standard situation for the application of a conventional driver guidance system. The latter has a display 1 which is arranged to the side of the driver in the dashboard. When this display is considered, the driver must therefore inevitably look to the side, so that during this time he cannot pay attention to the road traffic. The risk of accident is thus increased considerably. This state is particularly critical if the quantity of information which is conveyed to the driver will increase in future. However, the steering wheel in FIG. 1 already has an illuminated strip 2 for indicating hazardous situations.

Figure 2A:
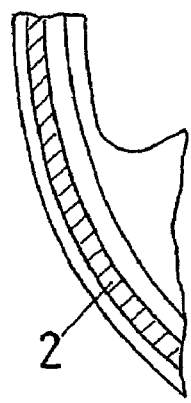
FIGS. 2A-2D show the arrangement of illuminated strips in the steering wheel.
Figure 2B:
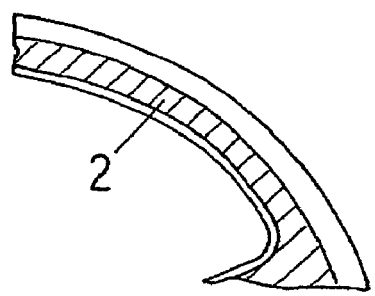
Figure 2C:
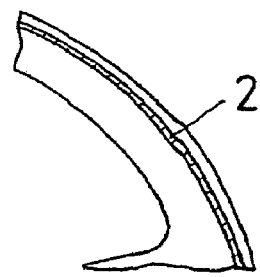
Figure 2D:
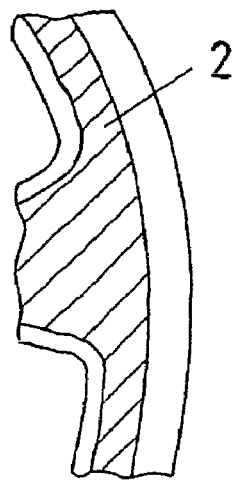

FIGS. 2A-2D show different embodiments of the strips 2. The strips 2 in the embodiment in FIG. 2C are narrower than in the other embodiments. These strips are suitable for indicating hazardous situations by virtue of the fact that they change color, for example, from green to red or change their intensity. These strips may, for example, by composed of a chain of multicolor LEDs which can emit different colors. These strips are suitable, for example, for indicating an excessively short distance from a vehicle which is located in front of the driver's own vehicle or else for conveying warnings of ice.

Figure 3:
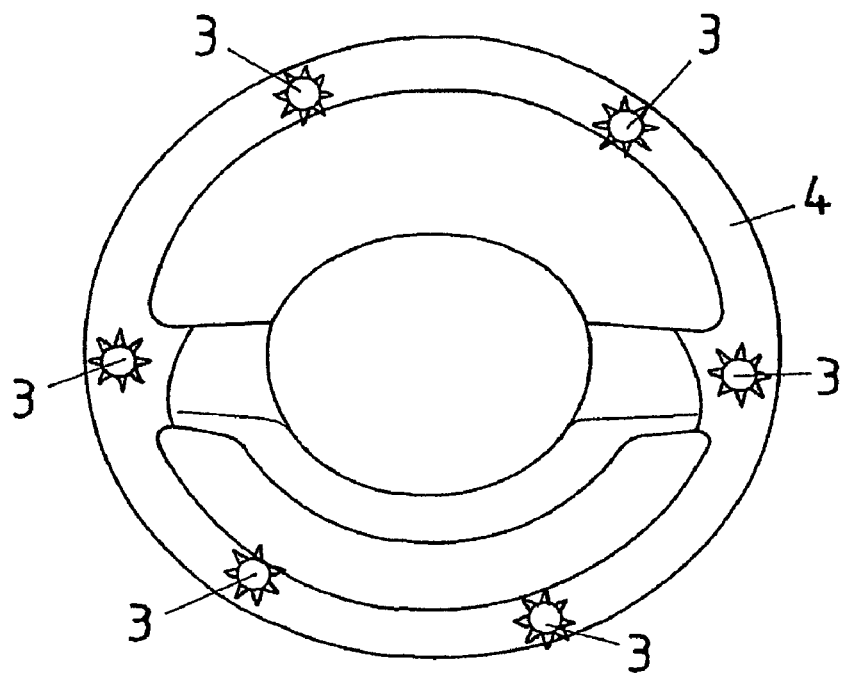
FIG. 3 shows a steering wheel with vibration elements.

FIG. 3 illustrates a steering wheel with vibration elements 3 which can also allow the driver to detect hazardous situations. The greater the hazard, for example of a collision with a vehicle traveling in front or with another vehicle located in front of the driver's own vehicle, for example at the end of a traffic jam, the greater the degree of vibration of the vibration elements 3 which are arranged at equal intervals on the steering wheel rim 4 in such a way that the driver feels at least one vibration element both when traveling straight ahead and when cornering. Different vibrations are caused by the fact that, for example, the rotational speed of small electric motors with rotating imbalance masses is changed or the frequency of an a.c. voltage applied to vibrating diaphragms is changed. Furthermore, in the case of vibrations with a constant frequency it is possible to change their rhythm as a function of the severity of the hazardous situations.

Figure 4A:
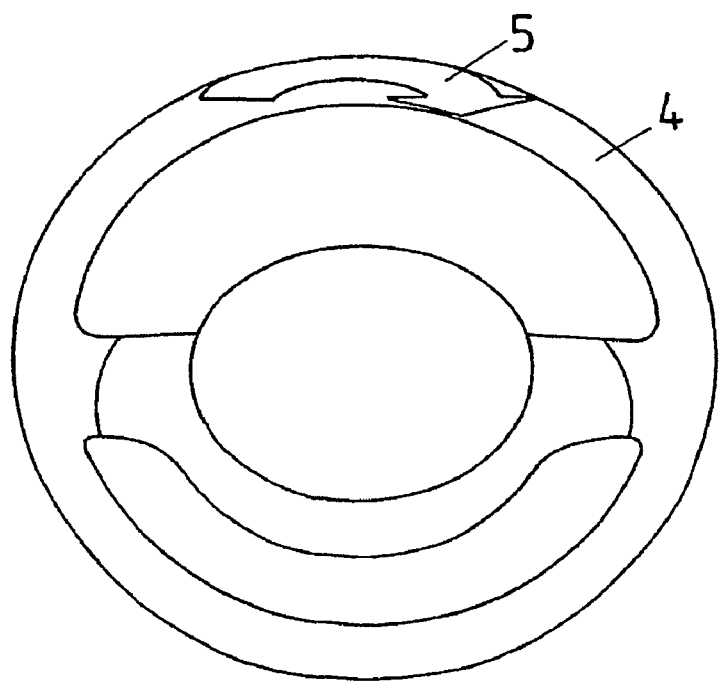
FIGS. 4A, 4B show steering wheels with symbols and strips which light up.
Figure 4B:
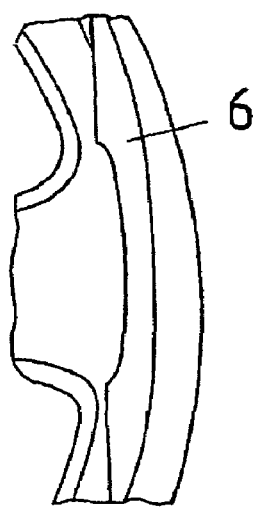

FIG. 4A illustrates a steering wheel in which an arrow 5 which lights up and which is part of a driver guidance system is provided in the steering wheel rim 4. For example, an arrow which points to the right and which indicates to the driver that he must turn off to the right at the next opportunity is illustrated here. In the same way, the prescribed straight-ahead travel can also be indicated by a strip 6 (FIG. 4B).

Figure 5:
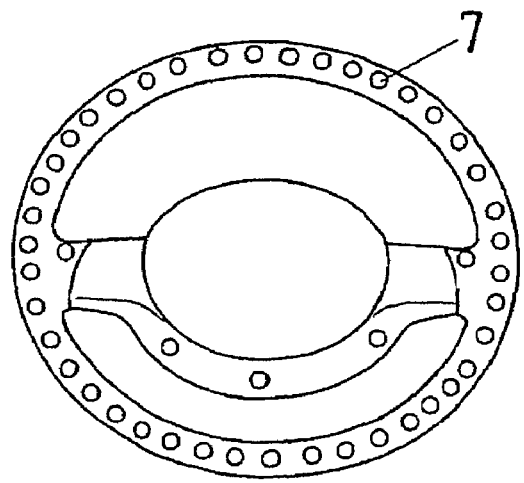
FIG. 5 shows a steering wheel with points which light up.

A further possible way of indicating changes in direction of travel is to arrange illuminated points 7 (FIG. 5). When there is a need to change the direction of travel, these points are actuated in such a way that they are successively illuminated to the right or to the left, i.e. a point which runs to the right or to the left can be seen.

Figure 6:
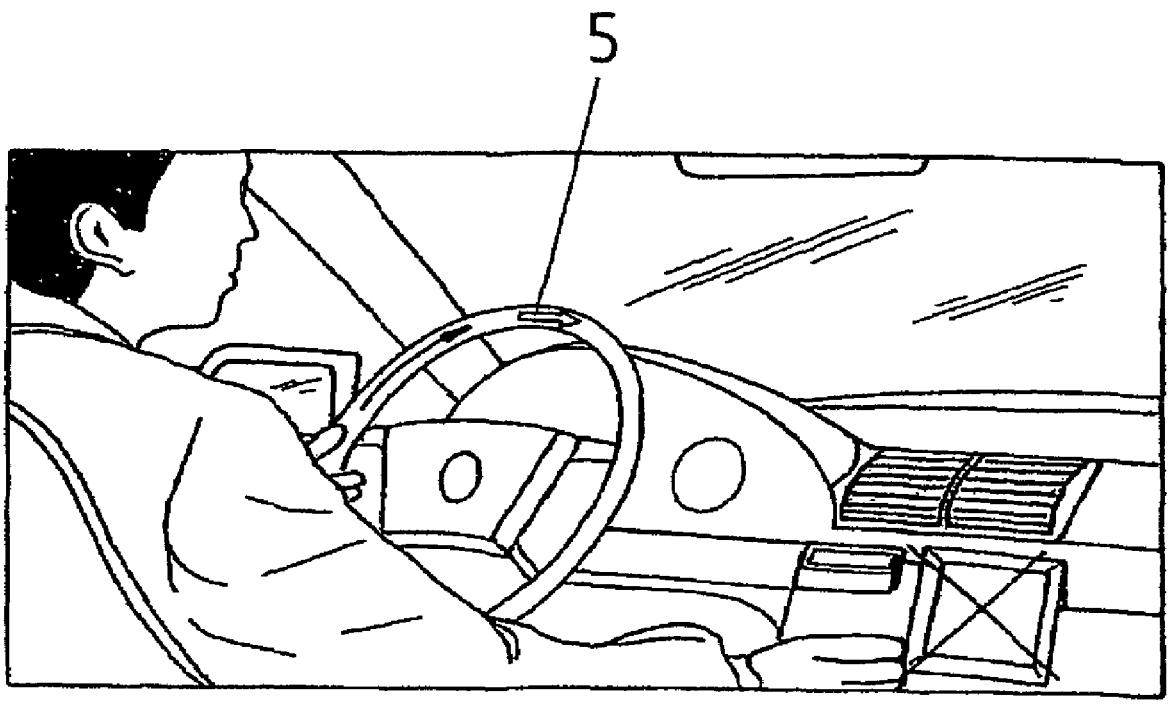
FIG. 6 shows the driver situation when a driver guidance system with a display on the steering wheel is applied.

FIG. 6 illustrates once more the driver situation when a driver guidance system is arranged on the steering wheel. By arranging arrows 5 which light up on the steering wheel it is possible to eliminate the display 1 to the side of the driver. The arrow which lights up can be perceived by the driver without him having to interrupt his observation of the road traffic. The display of this information can be combined with the information of a steering angle sensor.

Figure 7:
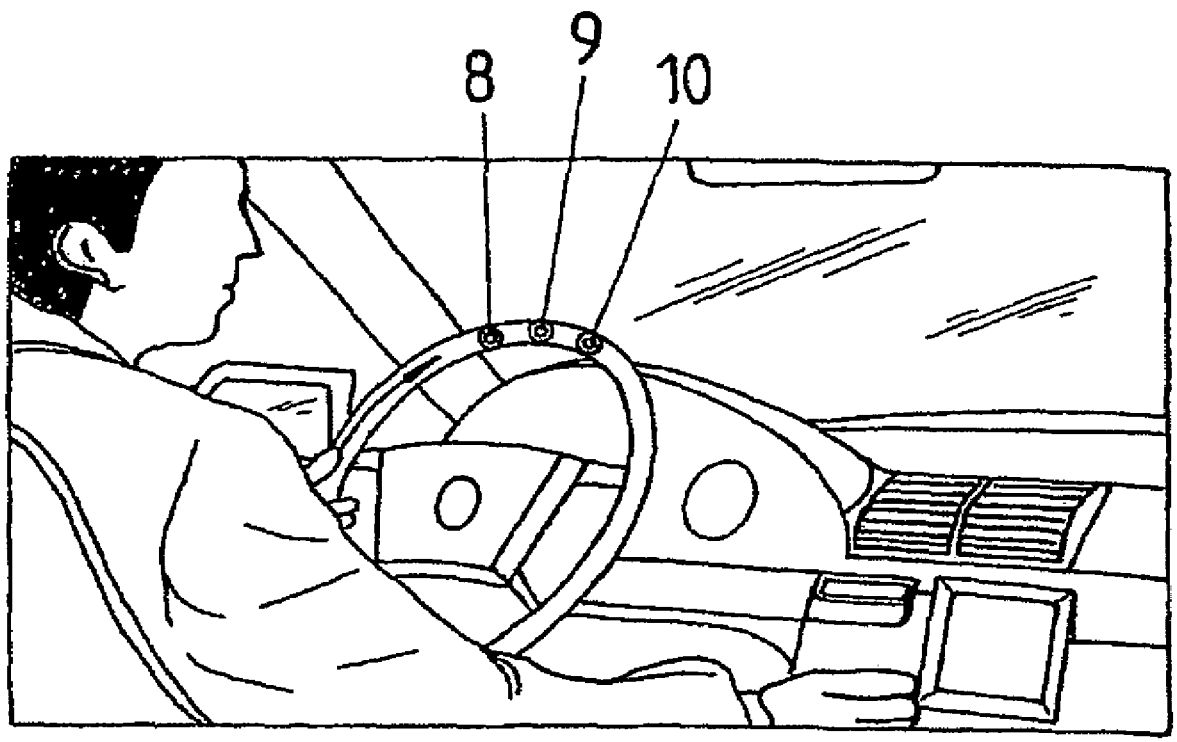
FIG. 7 shows the display of the information about the next traffic light.

FIG. 7 illustrates the display of the information about the next traffic light on the steering wheel. For this purpose, an element 8 which lights up in red, an element 9 which lights up in amber and an element 10 which lights up in green are provided on the steering wheel rim. The traffic light transmits information indicating whether it is showing red, amber or green. The corresponding element then lights up on the steering wheel. This information is advantageous if the next set of traffic lights cannot be seen until just before it is reached, for example owing to a bend. This display is, however, appropriate even for traffic lights which can be seen even from a long distance if an additional numerical display on the steering wheel indicates how long the indicated traffic light phase will still last. Such a numerical display is not illustrated in FIG. 7.

Figure 8:
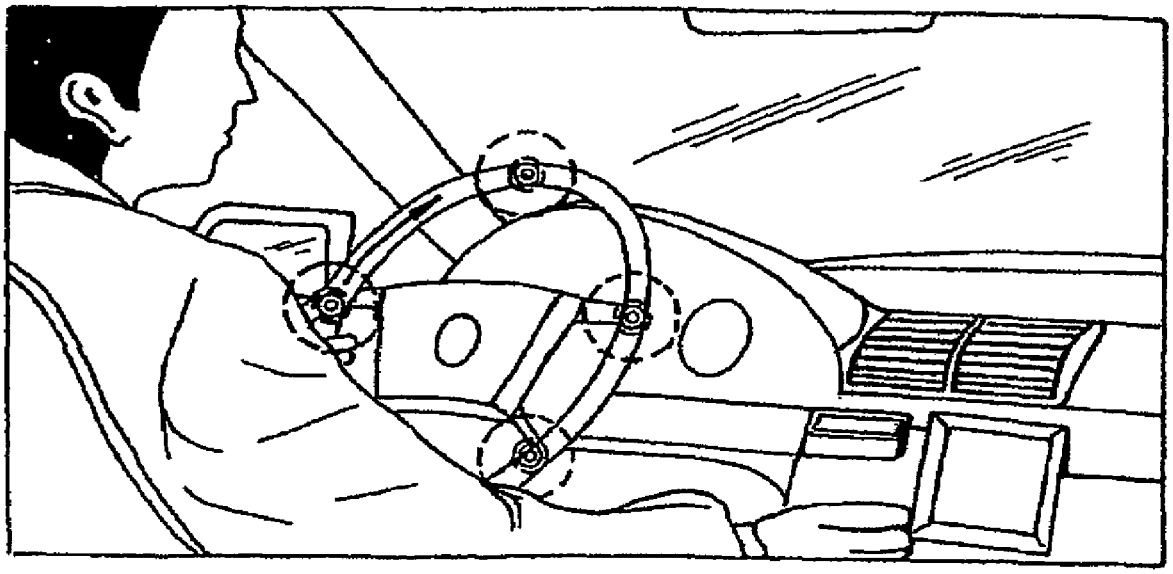
FIG. 8 shows the arrangement of vibration elements on the steering wheel.

The arrangement of vibration elements on the steering wheel is illustrated once more in FIG. 8. These elements should be arranged in such a way that they are perceived by the driver even if he is guiding the steering wheel with only one hand.

Figure 9A:
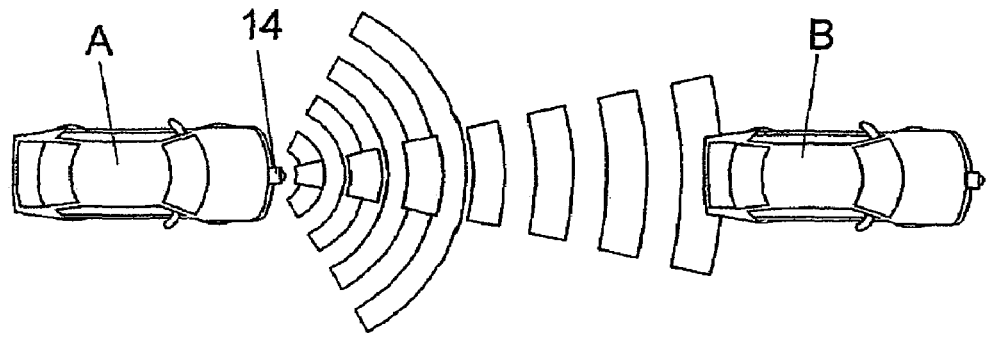
FIGS. 9A-9C show a vehicle at different distances from the vehicle in front with different input signals.
Figure 9B:
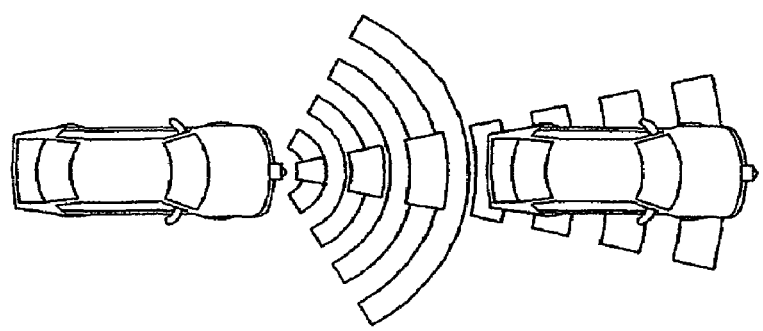
Figure 9C:
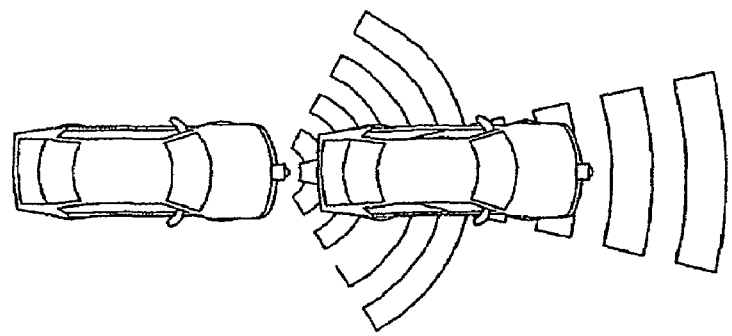

FIGS. 9D-9F show differently lighting-up steering wheel rims as a function of the distance between two vehicles which are shown in FIGS. 9A-9C. When a vehicle A approaches a vehicle B which is located in front of it, this is sensed by means of a sensor 14, as illustrated in FIG. 9A. An illuminated strip 11 in the steering wheel rim of the vehicle A is activated by the sensor, with the steering wheel rim firstly lighting up in green, as indicated in FIG. 9D by hatching. When the vehicle A approaches the vehicle B (FIG. 9B) more closely, the sensor causes the color in the strip to change or activates a color strip which lights up in yellow, so that a yellow strip 12 can be seen on the steering wheel rim of the vehicle A, as indicated by changed hatching in FIG. 9E. When the vehicle A approaches the vehicle B further, the color in the strip is made to change once more or a color strip which lights up in red is activated, so that a red strip 13 can now be seen on the steering wheel rim of the vehicle A, as indicated in FIG. 9F by hatching which is changed once more.

An additional warning can be brought about by changing intensity of the color strips and/or by flashing.

Figure 10A:
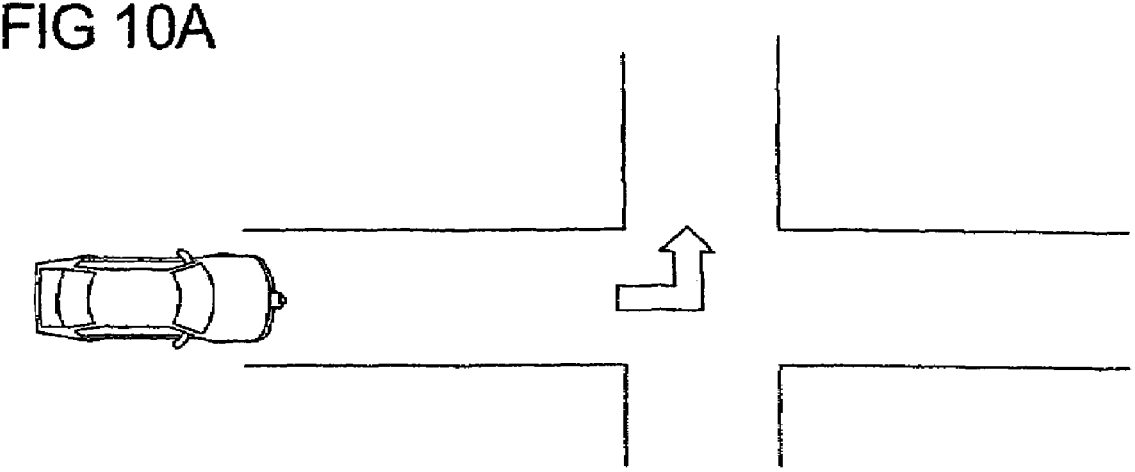
FIGS. 10A-10C show different route situations when there is a change in direction of travel.
Figure 10B:
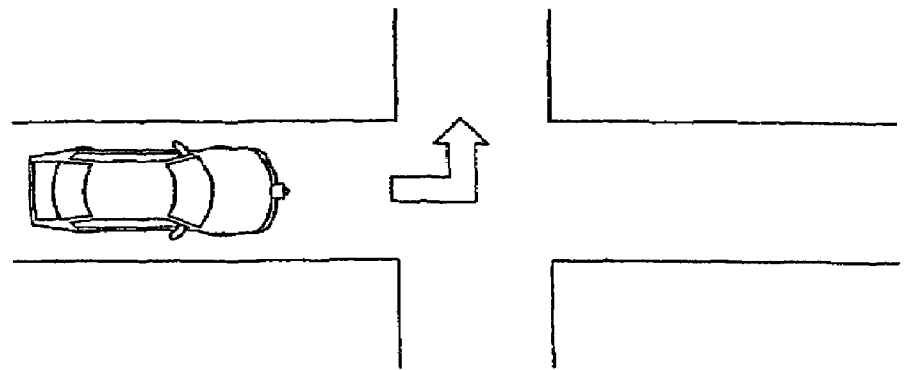
Figure 10C:
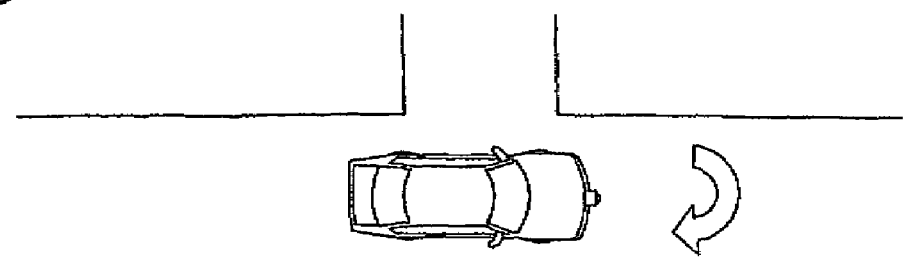
Figure 11C:
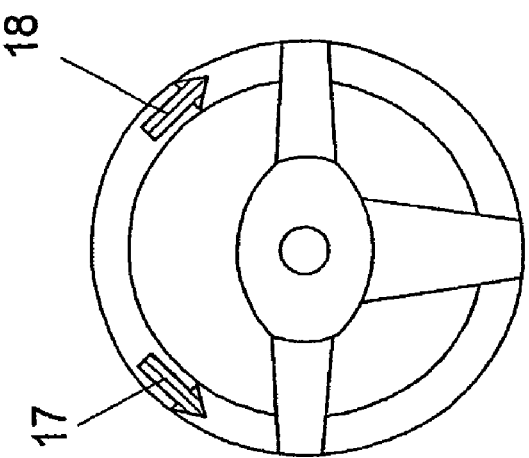
FIGS. 11A-11C show the display of the route situations of FIGS. 10A-10C on the steering wheel.
Figure 11B:
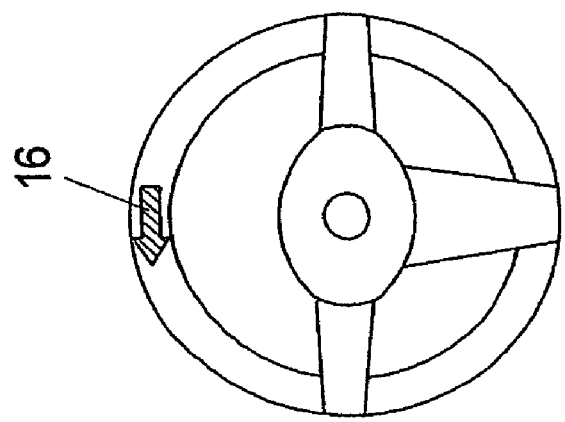
Figure 11A:
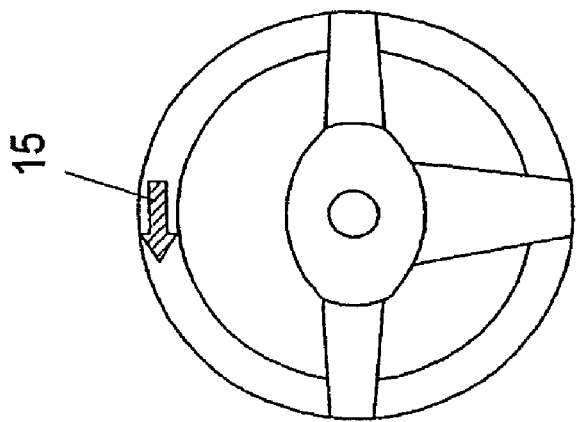

FIGS. 11A-11C illustrate the different route situations of FIGS. 10A-10C. When the vehicle approaches an intersection at which the direction of travel must be changed to the left in accordance with the prescription of the route information system (FIG. 10A), an arrow 15 which lights up in green appears on the steering wheel rim (FIG. 11A). This indicates to the driver that he must prepare to turn off to the left. When he approaches the intersection further as illustrated in FIG. 10B, the color of the arrow changes and an arrow 16 which lights up in red can be seen, as illustrated by different hatching in FIG. 11B. This arrow which lights up in red shows the driver that he must now turn off to the left.

If the need to turn off to the left is overlooked by the driver or recognized too late and he travels beyond the intersection, as illustrated in FIG. 10C, the route information system issues an instruction to turn around. For this purpose, two illuminated turning arrows 17 appear on the steering wheel, the left-hand turning arrow 17 of which points to the left and the right-hand turning arrow 18 of which points to the right, as can be seen in FIG. 11C.

Figure 12A:
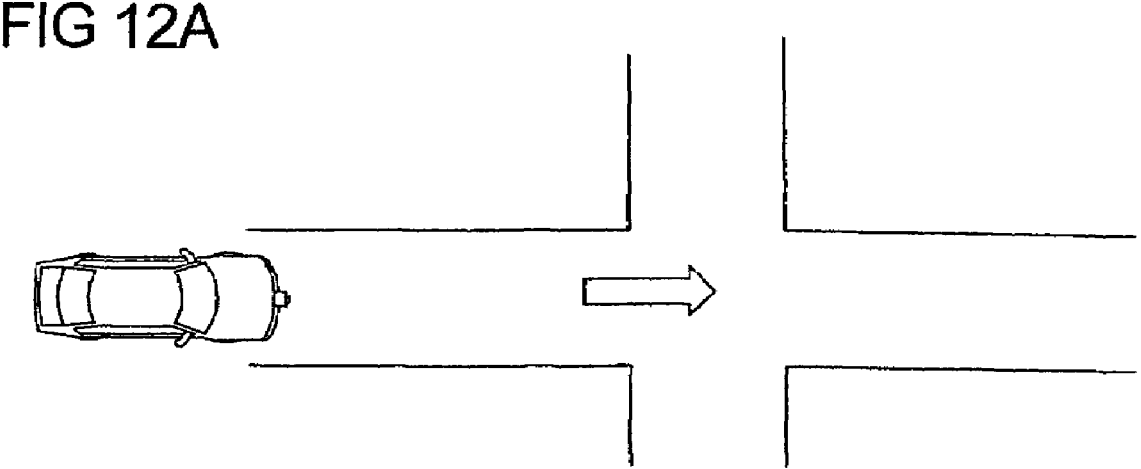
FIGS. 12A, 12B show different route situations as a function of the direction of travel.
Figure 13C:
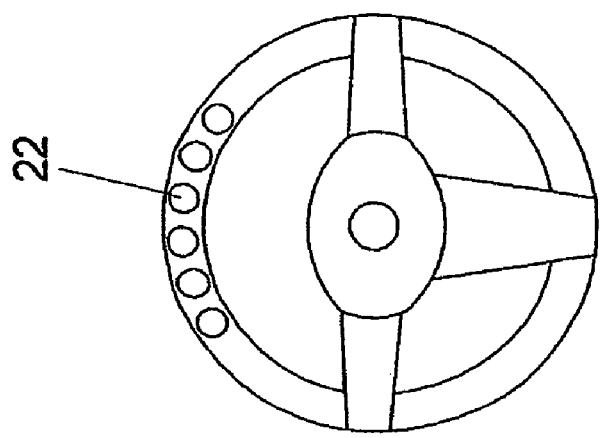
FIGS. 13A-13C show the display of the route situations of FIGS. 12A, 12B on the steering wheel.
Figure 13B:
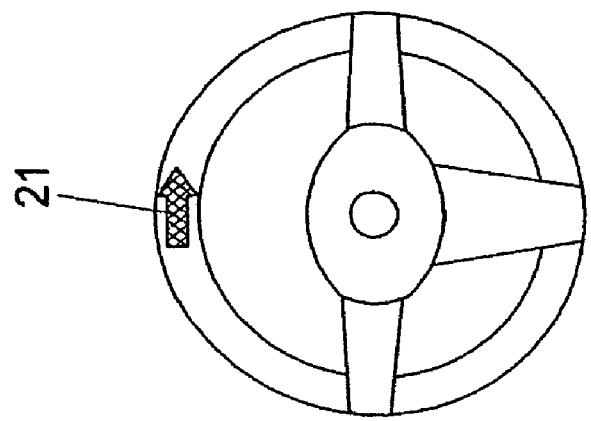
Figure 13A:
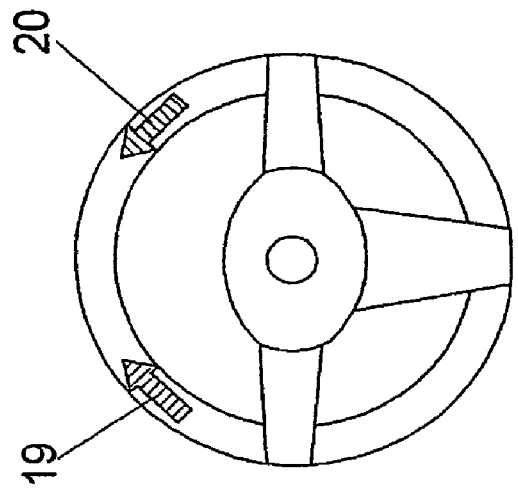

FIG. 13A shows the display of the straight-ahead travel which is shown in FIG. 12A and is prescribed by the route information system. Said straight-ahead travel is represented again by two illuminated arrows, a left-hand arrow 19 of which points to the right and a right-hand arrow 20 of which points to the left.

Figure 12B:
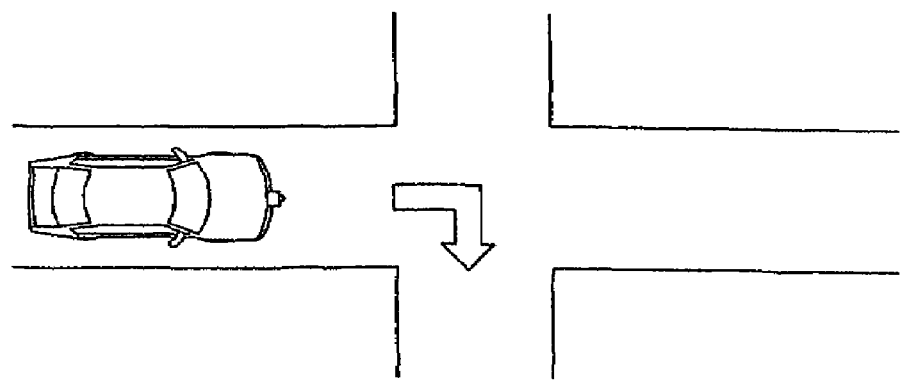

FIG. 13B illustrates the display on the steering wheel rim in the case of the prescribed turning off to the right in accordance with FIG. 12B. For this purpose, the route information system activates an illuminated arrow 21 which points to the right.

A further possible way of displaying the change in direction of travel which is to be performed are the illuminated arrows 22 which are illustrated in FIG. 13C. When there is a change of direction of travel to the right according to FIG. 12B, the points are activated starting from the left-hand side, in which case when one point lights up the preceding point goes out so that the impression is produced of an illuminated point moving from left to right. When there is a change in the direction of travel to the left, the points are activated in such a way that the impression is given of an illuminated point moving from right to left.

Figure 14A:
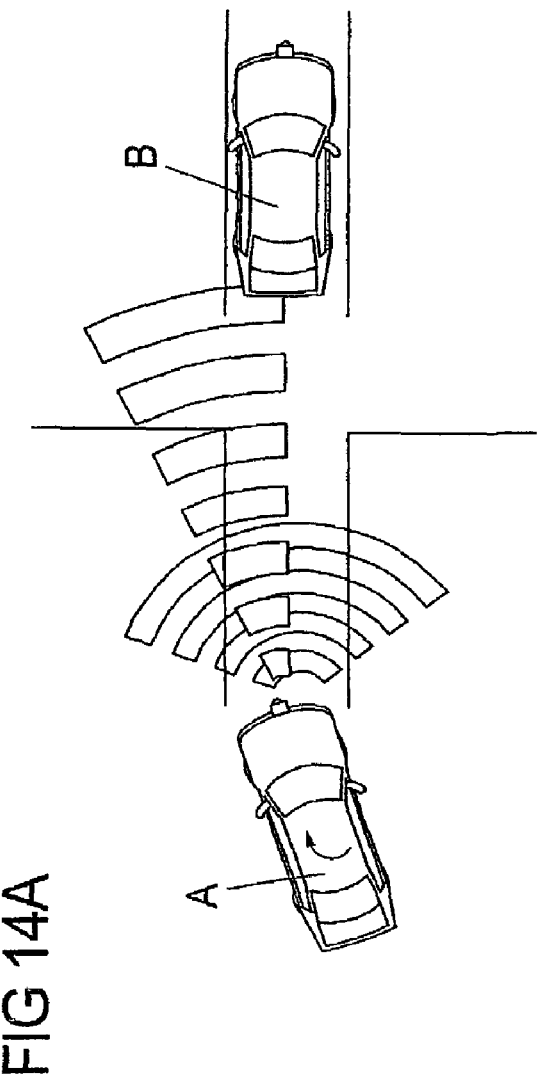
FIGS. 14A, 14B show hazard situations when the driver is experiencing fatigue.
Figure 15:
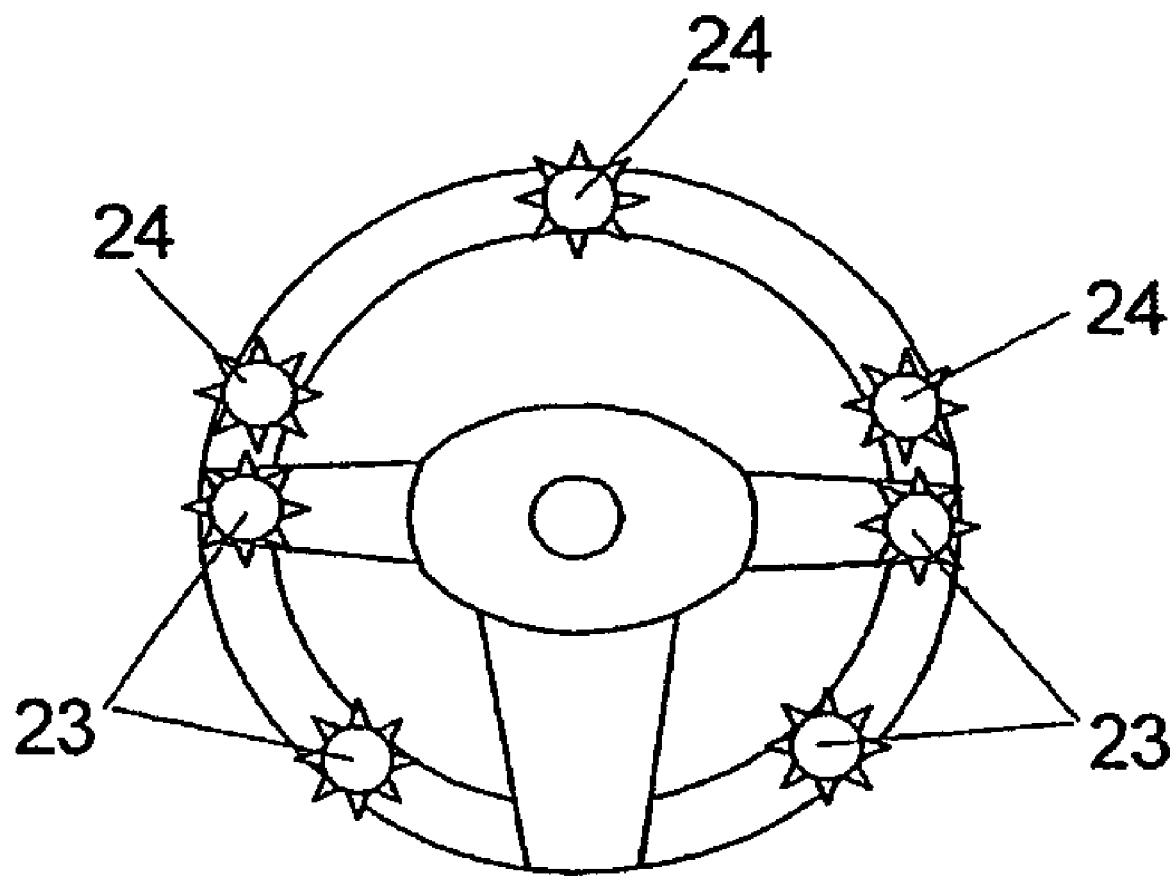
FIG. 15 shows the display of the situations from FIGS. 14A, 14B.

FIG. 14A illustrates a critical vehicle movement of the vehicle A as can be caused by driver fatigue. The driver no longer maintains his straight-ahead course but rather travels on a meandering course. A signal which is emitted by the vehicle A then strikes the vehicle B traveling in front to a greater or lesser extent or no longer strikes it at all. Vibration elements 23 on the steering wheel of the vehicle A are activated by the different strengths of response signals which reach the vehicle A (FIG. 15). In addition it is possible to activate light elements 24.

Figure 14B:
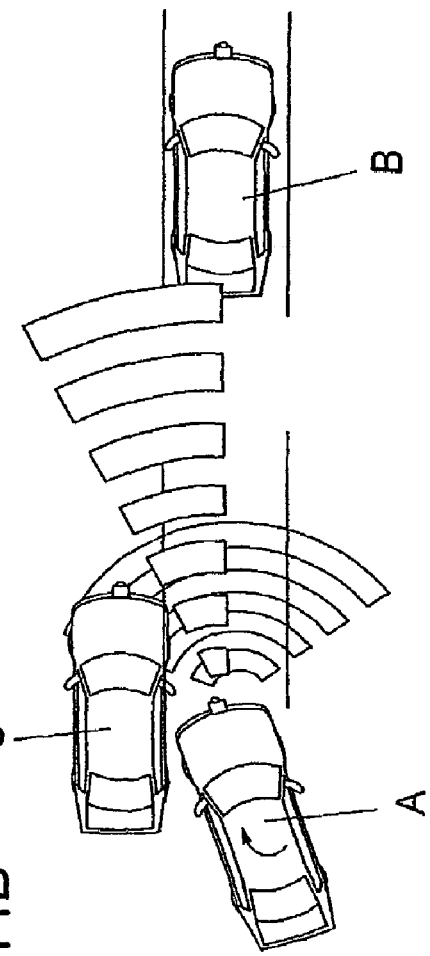

In FIG. 14B the situation is aggravated by the fact that during its critical vehicle movement the vehicle A is overtaken by a vehicle C. This vehicle is additionally sensed by the signal which is emitted by the vehicle A. This increased hazardous situation is indicated to the driver of the vehicle A by an increase in the vibration intensity of the vibration elements 23. In addition, this situation can be indicated by increasing the intensity of light or by flashing the lights element 24.

Figure 16:
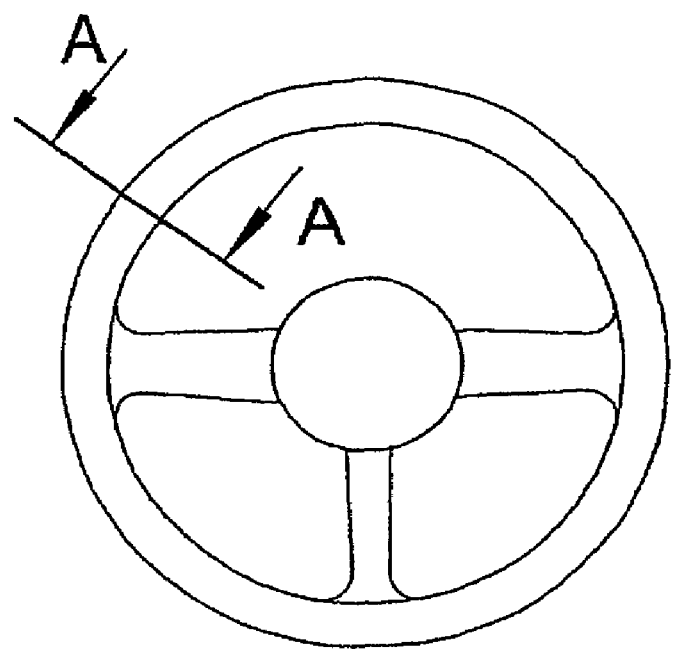
FIGS. 16-16B show a steering wheel with differently arranged light elements.
Figure 16A:
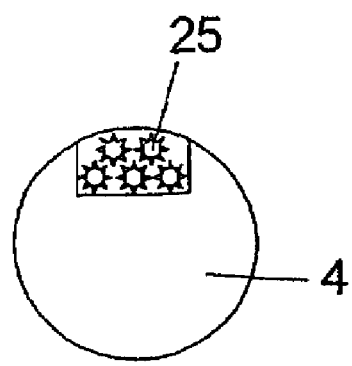
Figure 16B:
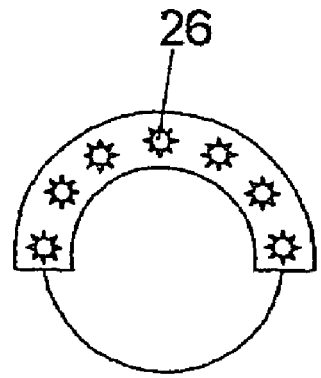

FIGS. 16, 16A and 16B illustrate different possible ways of implementing light elements.

FIGS. 16A and 16B show sections A-A through a steering wheel according to FIG. 16. In the embodiment in FIG. 16A, light elements 25, for example LED elements, are arranged in the steering wheel rim 4 in a region in the steering wheel rim which has a small cross section. The light elements may emit two or more colors and are activated simultaneously or successively in accordance with the signals of the route information system or of the receiver systems for sensing hazardous situations.

FIG. 16B shows an embodiment in which light elements 26 are arranged on the entire side of the steering wheel rim which faces the vehicle occupant, and said light elements 26 are activated in the same way as the light elements 25.

Figure 17:
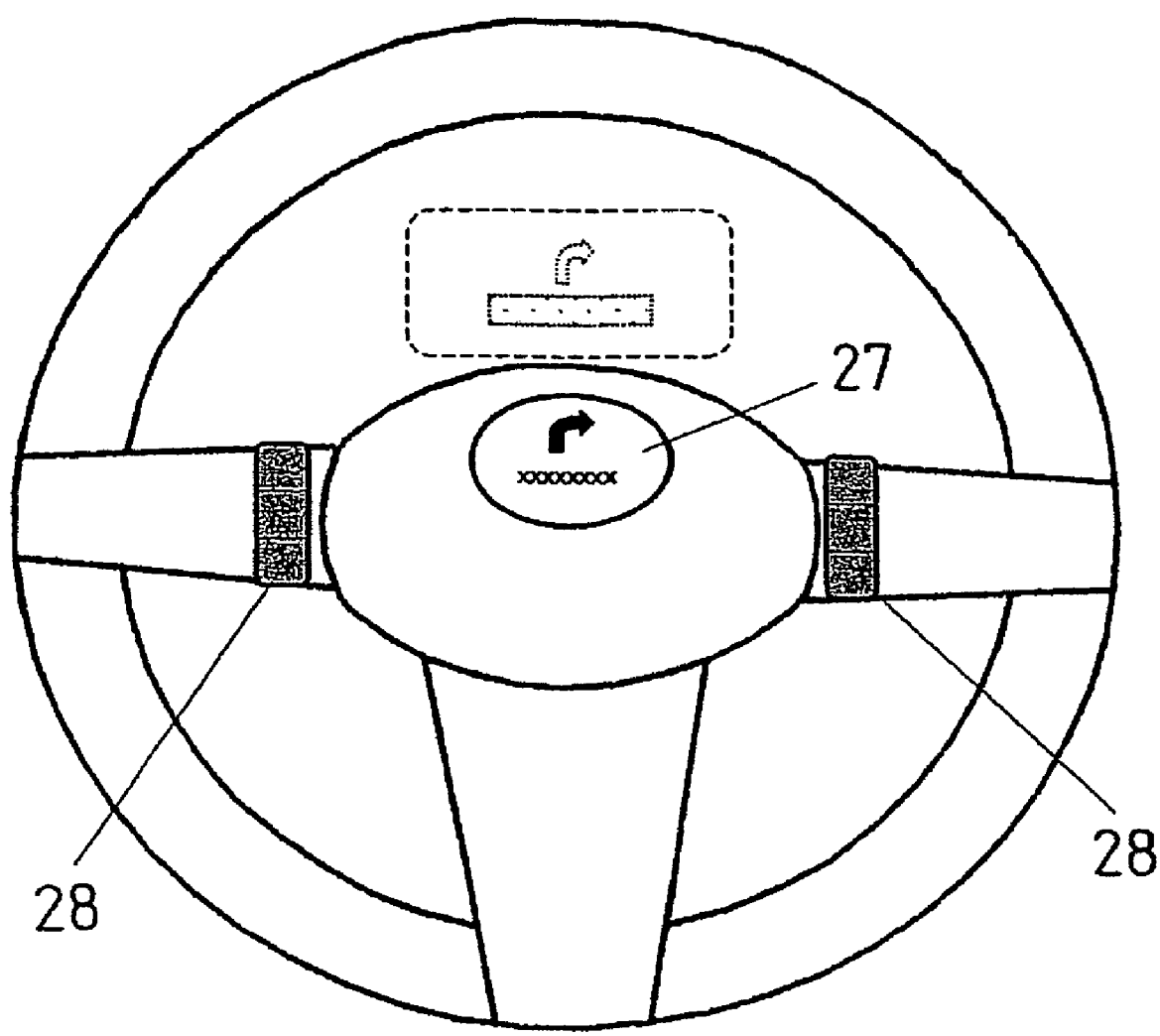
FIG. 17 shows a steering wheel in which an alpha-numeric display and also switches are arranged.

FIG. 17 illustrates a steering wheel which is equipped with a display 27 for displaying symbols and alphanumeric characters as well as switches 28. The display 27 may serve, for example, as a telephone display and display callers and the dialed number. The alphanumeric characters may be activated in such a way that the information in the display 27 stays in the position illustrated in FIG. 17 irrespective of the rotation of the steering wheel. The display can also be used, in conjunction with the switches, for inputting information for the navigation system and displaying it as well for displaying feedback messages from the navigation system during the driving mode. For safety reasons it may be expedient for certain functions to be capable of being operated only in the parked position.

Circuits known per se are used for activating the elements which are arranged on the steering wheel.

What is claimed is:

1. A steering wheel for motor vehicles having a driver guidance system with the steering wheel including an outer rim, a central hub, and spokes interconnecting the rim and the hub, wherein the steering wheel is embodied as a communications interface for the driver, characterized in that arrows or moving points are provided as display elements of the driver guidance system on the steering wheel rim for the recommended direction of travel as determined by the driver guidance system.

2. The steering wheel as claimed in claim 1, characterized in that the display elements are light elements, and warning functions can be represented by changing colors and/or radiation intensity of the light elements and/or by flashing the light elements.

3. The steering wheel as claimed in claim 1, characterized in that switches are provided on the steering wheel for inputting information for a navigation or telephone system and having the information displayed.

4. A steering wheel for motor vehicles, wherein the steering wheel is embodied as a communications interface for the driver, characterized in that arrows or moving points are provided as display elements for the recommended direction of travel for a driver guidance system and in that the arrows or points can be actuated as a function of distance from a location of change in the direction of travel in such a way that they light up to different degrees or have different colors.

5. A steering wheel for motor vehicles, wherein the steering wheel is embodied as a communications interface for the driver, characterized in that arrows or moving points are provided as display elements for the recommended direction of travel for a driver guidance system and in that when a location of change in the direction of travel is reached the arrows or points are actuated in such a way that they flash.

6. A steering wheel for motor vehicles, wherein the steering wheel is embodied as a communications interface for the driver, characterized in that arrows or moving points are provided as display elements for the recommended direction of travel for a driver guidance system and in that the arrows or points change color from green to red when a location of change in the direction of travel is approached.

7. A steering wheel for motor vehicles, wherein the steering wheel is embodied as a communications interface for the driver, characterized in that arrows or moving points are provided as display elements for the recommended direction of travel for a driver guidance system and in that color elements which correspond to traffic lights are provided for displaying traffic light information.

8. The steering wheel as claimed in claim 7, characterized in that a numerical display in the steering wheel which indicates a period of time until the traffic light display changes next is provided.

* * * * *